United States Patent [19]

Grzesik et al.

[11] Patent Number: 4,946,248
[45] Date of Patent: Aug. 7, 1990

[54] CONNECTION END OF A LIGHT WAVEGUIDE BONDED TO A HOLDER

[75] Inventors: Ulrich Grzesik, Bergisch-Gladbach; Erich Schürmann, Sendenhorst, both of Fed. Rep. of Germany

[73] Assignee: U.S. Philips Corp., New York, N.Y.

[21] Appl. No.: 179,106

[22] Filed: Apr. 8, 1988

[30] Foreign Application Priority Data

Apr. 9, 1987 [DE] Fed. Rep. of Germany ....... 3711966

[51] Int. Cl.$^5$ ............................................. G02B 6/38
[52] U.S. Cl. .................................................. 350/96.21
[58] Field of Search ........................... 350/96.20, 96.21

[56] References Cited

U.S. PATENT DOCUMENTS

| | | | |
|---|---|---|---|
| 4,186,997 | 2/1980 | Schumacher | 350/96.21 |
| 4,434,554 | 3/1984 | Korbelak | 30/90.8 |
| 4,593,972 | 6/1986 | Gibson | 350/96.21 |
| 4,707,069 | 11/1987 | Hoffman | 350/96.21 |

Primary Examiner—William L. Sikes
Assistant Examiner—Robert E. Wise
Attorney, Agent, or Firm—Ernestine C. Bartlett

[57] ABSTRACT

The connection end of a light waveguide (LWG) is bonded to a holder for use in coupling the LWG to a plug connector. Two axially extending centering surfaces are provided which enable aligning the connection end of the LWG in a guide groove of the connector. Such centering surfaces are exposed axial zones of the glass sheath layer of the LWG, in which zones the outer primary coating of the LWG have been removed. Removal thereof is preferably effected by a cutting tool.

4 Claims, 1 Drawing Sheet

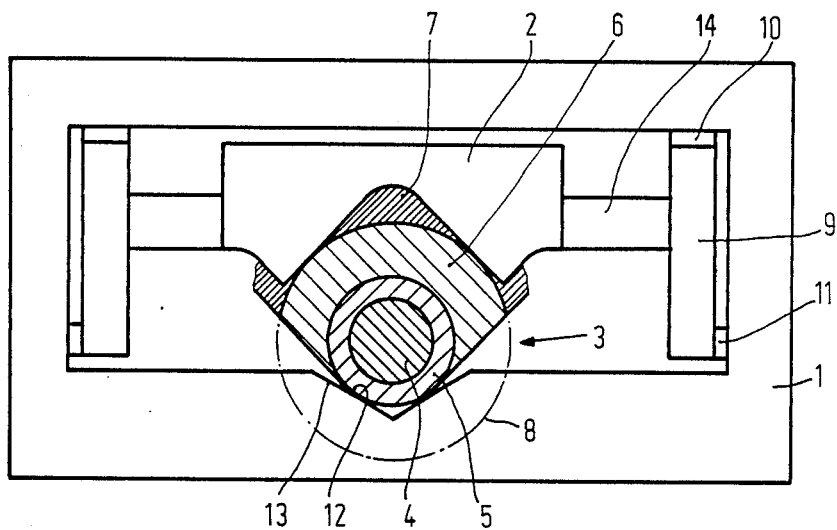

CONNECTION END OF A LIGHT WAVEGUIDE BONDED TO A HOLDER

FIELD AND BACKGROUND OF THE INVENTION

The invention relates to a connection end of a light waveguide (LWG) bonded to a holder for the manufacture of plug connectors in which axially extending centering faces are provided which enable laying an adjusting element with predetermined parallel arrangement in a guide groove.

In such an arrangement known, for example, from Electronic Letters 1974, vol. 10, No. 14, p. 280, the holder is a cylindrical body receiving the connection end of the LWG centrically and whose outer surface must be accurately machined as a centering face since on the one hand the outside diameter must be accurately established and on the other hand no displacement is possible with respect to the LWG.

SUMMARY OF THE INVENTION

It is the object of the invention to provide a connection end of a light waveguide bonded to a holder for the manufacture of plug connectors in which axially extending centering faces are provided which enable laying an adjusting element with predetermined parallel arrangement in a guide groove which can more simply be manufactured.

According to the invention this object is achieved in that the connection end of the LWG is bonded to an outer surface of the holder and that the centering surfaces for aligning the connection end in a guide groove of a connector are formed by exposed areas of the sheath layer of the LWG.

An LWG has a light conducting core preferably consisting of doped quartz glass which is surrounded by a sheath layer which is also preferably manufactured from quartz glass whose refractive index is lower than the refractive index of the core. Immediately after drawing the LWG from a preform, a primary coating is provided which consists of a material that is considerably much softer than the sheath layer of the LWG. In especially preferred embodiments, the coating is a UV-cured synthetic resin.

It has been found that the concentricity of the outer circumference of the sheath layer of an LWG drawn from a preform occurs very accurately concentrically to the center line of the core of the LWG so that the outer surface of the sheath layer itself in the case of a monomode LWG is very readily suitable as a centering face for the manufacture of plug connectors.

In the arrangement according to the invention it is no longer the holder which serves for the centering guiding but the area of the sheath layer of the LWG from which the protective coating has been removed. Therefore, no expensive processing operations are required for the formation of accurate centering faces. Nevertheless, the connection end of the LWG is simple and easy to handle due to the holder being rigidly connected thereto, in contrast to such known constructions in which connection ends from which the protective coating has been removed entirely, have to be threaded directly in guide grooves of an adjusting element in which damage to the LWG cannot be avoided.

According to a preferred embodiment the connection end of the LWG is bonded to the holder via the primary coating provided on the sheath layer, after which the centering faces are produced by removing the primary coating in at least two circumferential areas of the LWG. Bonding of the holder to the primary coating produces a particularly reliable bonding effect. On the one hand, the diameter of the primary coating is larger than that of the sheath layer. On the other hand a good bonding to the synthetic resin of the primary coating is obtained which is better than a bonding to the quartz glass of the sheath layer of the LWG. Producing the centering faces only after bonding the LWG to the holder provides the advantage that the connection end of the LWG is protected in a readily handleable manner by the holder.

As compared with a removal of the primary coating by means of chemical methods it is preferred that the primary coating is removed by a cutting tool the hardness of which is less than that of the sheath layer and greater than that of the primary coating. The bonding site cannot be influenced by solvent. Moreover, the softer material of the cutting tool cannot damage the surface of the sheath layer. The cutting tool, being softer than quartz glass, may be compressed with a certain force. Its cut adjusts elastically to a certain extent to the surface of the sheath layer so that strip-shaped zones of the sheath layer are exposed. Particularly suitable are tools which make approximately V-shaped cuts inclined towards each other and forming an angle with each other which is slightly smaller than that of a prismatic guide groove. With a single cutting operation two circumferential areas of the sheath layer are exposed which are to be used as centering faces at the corner areas of the prismatic guide groove. Such tools are generally well known in the art and may be constructed, for example, as disclosed and claimed in U.S. Pat. No. 4,434,554 issued Mar. 6, 1984.

Since a cylindrically smooth form of the holder is no longer required, a further embodiment of the invention provides that the holder comprises centering faces for coarse alignment with respect to an adjusting element so that easier guiding of the connection end of the LWG in a guide groove is possible.

Moreover it is preferred that the holder comprise integrated resilient elements via which it engages associated holding surfaces of an adjusting element and/or of a housing for the adjusting element in such a manner that the LWG is pressed resiliently in the guide groove of the adjusting element and/or is pressed resiliently against the end face of a connection end of a further LWG to be connected thereto. The holder then serves several functions as an integrated component so that a simply constructed plug connector may be provided.

BRIEF DESCRIPTION OF THE DRAWING

The FIGURE is a diagrammatic illustration showing in elevation the end of a holder according the invention in which the bonded LWG is shown in cross-section.

DETAILED DESCRIPTION OF PREFERRED EMBODIMENTS

The invention will now be described in greater detail, by way of example, with reference to the description of an advantageous embodiment shown diagrammatically in the drawing.

A box-like housing is denoted by 1 in whose open end side a holder 2 having bonded thereto an end of an LWG 3 can be inserted.

The optically active part of the LWG 3 consists of a core 4 and a surrounding sheath layer 5 which both consist of optionally doped relatively hard quartz glass.

The LWG 3 with the primary coating 6 (circle 8) surrounding the same on all sides was bonded to the holder 2 by means of adhesive 7. Only then were the non-shaded parts of the primary coating, which are shown in dot and dash lines as circle 8, cut away. For that purpose a cutting tool such as that disclosed in U.S. Pat. No. 4,434,554 having V-shaped cutters inclined towards each other were used the hardness of which was greater than that of the synthetic resin of the primary coating and substantially less than that of quartz glass. The cutters were set at an acute angle to the LWG axis, pressed against the LWG with a defined force and then drawn in the longitudinal direction of the LWG so that the desired areas of the primary coating 6 were chipped off. Since the material of the cutters of the cutting tool was essentially softer than quartz glass, the sheath layer of the LWG was not damaged. By elastic deformation the contour of the cutters were adapted on a limited angular area to the outer contour of the sheath layer 5 so that the area shown in the FIGURE was clearly removed.

Adjusting or guide elements 9 on each side of the holder 2 are connected thereto by two resilient pins 14, which elements slidingly engage inner surfaces of the housing via sections 10 and 11 which comprise insert slopes. The section 10 are elastically deflected so that the centering faces of the sheath layer 5 are pressed against the angle surfaces 13 of the guide groove with a predetermined pressure force. The resilient pins are capable of also providing the resilient force which is required for the pressing together of the end faces of the LWG 3 with the end faces of a corresponding further LWG to be coupled thereto.

Of course locking elements for fixing the adjusting position of the guide elements 9 in the housing 1 as well as sliding guides may be provided in such a manner that the LWG 3 is pressed against the surfaces 13 of the guide groove only shortly before reaching its final position. Such structural arrangements as they are known, for example, in a similar form from DE-PS 2805949 which corresponds substantially to U.S. Pat. No. 4,186,997 will be obvious to those skilled in the art.

What is claimed is:

1. A connection assembly at a connection end of a light waveguide (LWG) for enabling coupling of the LWG to a plug connector; the LWG having a central core, a sheath layer over the central core, and an outer coating over the sheath layer; said connection assembly comprising:
    a holder bonded to the outer coating of said LWG over a portion of the circumferential area of said connection end and extending in the axial direction of the LWG; and
    a pair of surfaces formed on another portion of the circumferential area of said connection end by removal of said outer coating from such other portion thereof, each of said surfaces including a respective exposed axially extending zone of said sheath layer where said outer coating has been removed therefrom;
    said exposed zones of said sheath layer causing axial centering of said connection end of the LWG in a vee-shaped guide groove of a plug connector when said connection end is positioned so that said zones are in contact with respective surfaces of said guide groove.

2. A connection assembly as claimed in claim 1, further comprising a plug connector having a housing which includes said vee-shaped guide groove; and a plurality of resilient centering elements affixed to said holder and contacting said housing for guiding said holder to position said connection end of the LWG in said housing so that said zones of said sheath layer are in said vee-shaped guide groove.

3. A connection assembly as claimed in claim 2, wherein said centering elements engage said connector housing in such a manner than said zones of said sheath layer are resiliently pressed in contact with respective surfaces of said vee-shaped guide groove and the end faces of said LWG are resiliently pressed against end faces of a further LWG to be coupled thereto by said plug connector.

4. A method of providing a connection assembly at a connection end of a light waveguide (LWG) to enable coupling thereof to a plug connector having a housing which includes a vee-shaped guide groove, the LWG having a central core, a sheath layer over the central core, and an outer coating over the sheath layer; such method comprising:
    bonding a holder to the outer coating of said LWG over a portion of the circumferential area of said connection end, said holder extending in the axial direction of the LWG;
    forming a pair of substantially planar surfaces on another portion of the circumferential area of said connection end by means of a cutting tool which removes said outer coating from such other portion thereof, each of said surfaces including a respective exposed axially extending zone of said sheath layer where said outer layer has been removed therefrom;
    placing said holder with said connecting end of the LWG in said housing, positioned so that said exposed zones of said sheath layer are in said vee-shaped guide groove; and
    resiliently pressing said connection end into said vee-shaped guide groove so that said exposed zones of said sheath layer contact respective surfaces of said vee-shaped groove and thereby center said connection end in said plug connector.

* * * * *